No. 815,775. PATENTED MAR. 20, 1906.
O. D. WOODRUFF.
DOUGH MIXER AND KNEADER.
APPLICATION FILED JULY 21, 1905.
2 SHEETS—SHEET 2.
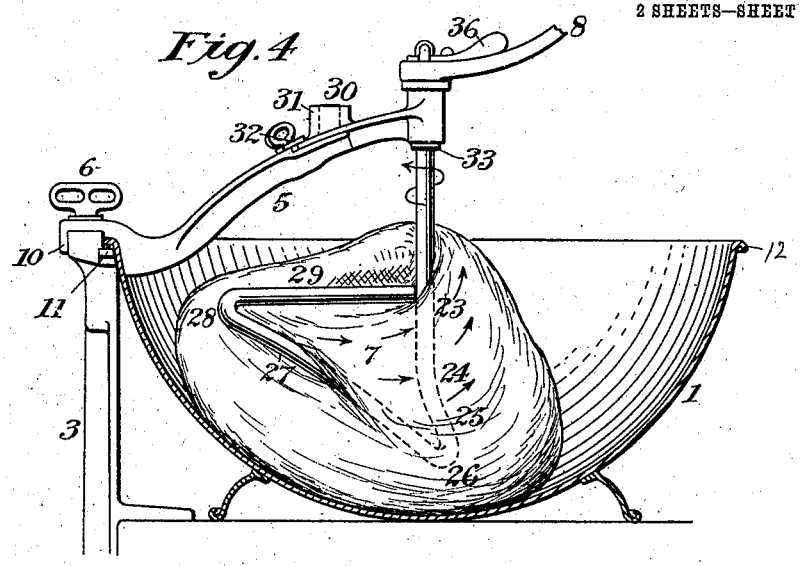
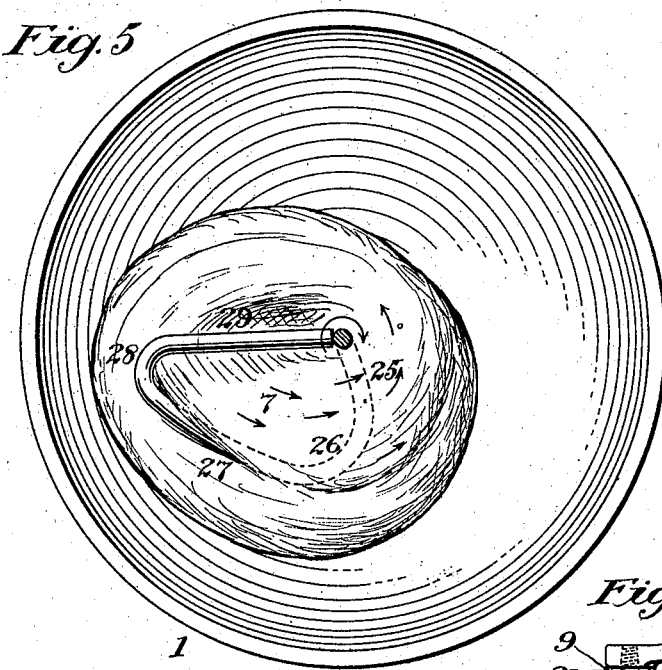
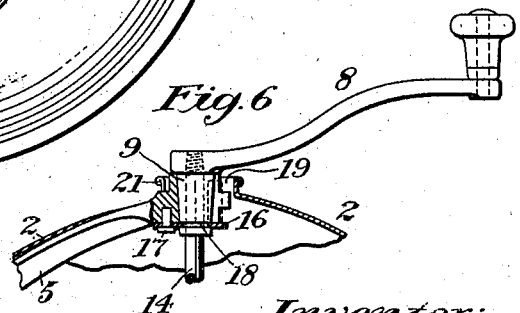
Witnesses:
Chas. D. King.
Wilbur M. Stone.
Inventor:
Oliver D. Woodruff.
by Albert H. Walker Atty

UNITED STATES PATENT OFFICE.

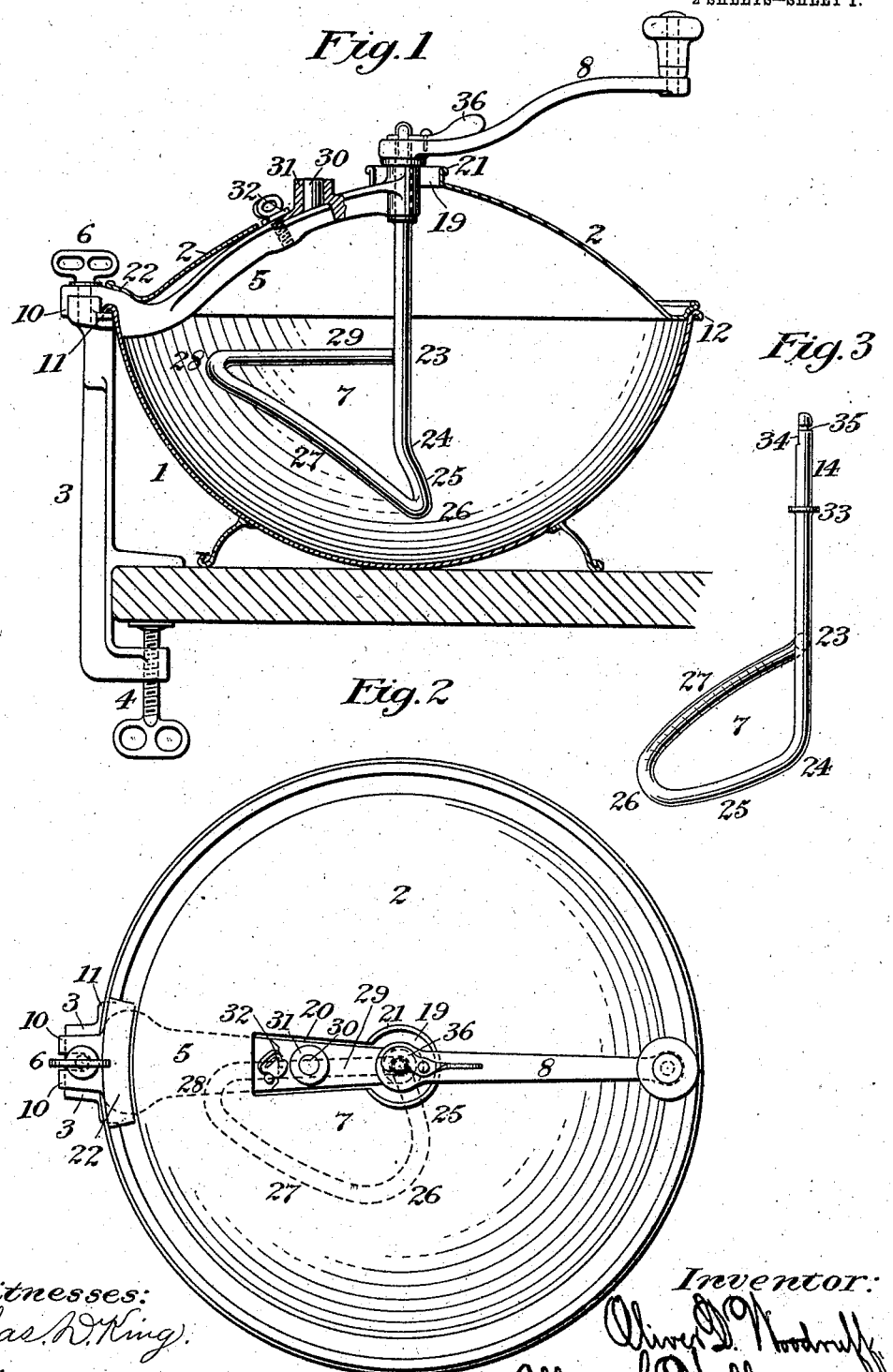

OLIVER D. WOODRUFF, OF SOUTHINGTON, CONNECTICUT.

DOUGH MIXER AND KNEADER.

No. 815,775.

Specification of Letters Patent.

Patented March 20, 1906.

Application filed July 21, 1905. Serial No. 270,636.

*To all whom it may concern:*

Be it known that I, OLIVER D. WOODRUFF, of Southington, Connecticut, have invented a new and useful Improvement in Dough Mixers and Kneaders, of which the following description and claims constitute the specification and which is illustrated by the accompanying drawings.

This apparatus is a mechanical dough mixer and kneader.

Figure 1 of the drawings is a side elevation of the entire apparatus, except that it shows in section the pan and the cover of the pan and a part of a jointed bracket and a segment of the table upon which the apparatus stands and to which it is attached. Fig. 2 is a plan view of the apparatus. Fig. 3 is a side view of the rotor looking at that part from the right-hand side of Fig. 1 and toward the right-hand side of the rotor as it appears in Fig. 1. Fig. 4 is a side elevation of the apparatus, except that the cover is absent and part of the crank is broken away and the pan is in section, and this figure also shows a mass of dough being kneaded by the rotor in the pan. Fig. 5 is a plan view of the pan and of the working part of the rotor kneading a mass of dough in the pan. Fig. 6 is a vertical section of an alternative form of connection of the shank of the rotor with the bracket which supports it. Fig. 7 is a plan view of the end of the alternative form of the bracket. Fig. 8 is a side view of the latch which is appurtenant to that end of that form of bracket.

The numeral 1 indicates a tinned pan, the interior of which is preferably in the form of a segment of a sphere without any corner and without any change of curvature. The numeral 2 indicates a special cover for that pan which is particularly adapted to my apparatus.

The numeral 3 indicates an upright standard clamped to the table by the set-screw 4.

The numeral 5 indicates a radial and approximately horizontal bracket, the outer end of which is attached to the upper end of the standard 3 by the set-screw 6 and the inner end of which supports the rotor 7 and the rotor-crank 8. The outer end of the bracket 5 is bifurcated, as shown in Fig. 2, so that the bracket can be withdrawn from the upper end of the standard 3 when the set-screw 6 is unscrewed through only a part of its length. The outer end of those bifurcations of the bracket 5 are each provided with the downwardly-extending projection 10 for hooking over the upper end of the standard 3, and the upper end of that standard is provided with the segmental shelf 11 for the reception of the beaded edge 12 of the pan 1 when that beaded edge is clamped between the upper end of the standard 3 and the lower side of the bracket 5, as shown in Fig. 1.

The cover 2 is provided with the axial opening 19 and also with the radial opening 20, which extends from that axial opening about one-half of the distance toward the edge of the cover. The axial part of this compound opening is bounded by the segmental flange 21. The outer border of the cover is also provided with the segmental portion 22, which occupies a higher plane than the other parts of that outer border, so as to give room for the bracket 5 between that part of the cover and the beaded edge 12 of the pan 1 without raising the other parts of the annular border of the cover above the beaded edge of the pan. The cover being thus specially constructed can be placed in position upon the pan after the revolving parts of the apparatus are in place by passing the compound opening of the cover over the crank-handle and the crank and then by turning the cover around, if necessary, to bring the radial part 20 of that opening directly over the bracket 5 and then lowering the cover into place, so that the segmental portion 22 of its border will inclose the flat shank of that bracket.

The bracket 5 is preferably made in two parts detachably united by the dowel 30 and the dowel-receiver 31 and the dowel-latch 32. In this case the rotor 7 has its shank 14 provided with the flange 33 below its vertical bearing in the inner end of the bracket 5 and also has the flat surface 34 and the segmental annular groove 35 at the upper end of that shank for engagement with the rotor-crank 8 and the rotor-latch 36, respectively. These parts are assembled by passing the shank of the rotor upward into the vertical bearing in the bracket 5 until the flange 33 reaches the lower side of that bracket and thereupon placing the hub of the rotor-crank upon the upper end of the rotor-shank and then turning the rotor-latch into the groove 35.

In the alternative mechanism shown in Figs. 6, 7, and 8 the radial bracket is made in one piece; but in this form the inner end of the bracket is bifurcated, as shown in Figs. 6 and 7, so that the rotor can be inserted in place by carrying it laterally from right to left at such a level that the rotor-shank 14 will pass between those bifurcations until the hub 9 of the crank 8 reaches a point directly over the segmental bearing 15, whereupon that hub is carried downward into that bearing, and then the latch 16 is oscillated forward upon its pivot 17 from the position shown in Fig. 7 to that shown in Fig. 6, in which latter position it engages with the annular groove 18, which extends around the hub 9.

The rotor 7 consists of a rod bent into the peculiar form shown in the drawings. In the preferred form of the apparatus the shank of the rotor is detachably attached to the rotor-crank and carried by the bracket 5 in the way shown in Figs. 1, 2, 3, and 4 of the drawings; but the rotor-shank may be provided at its upper end with a screw-thread for permanent insertion in a threaded axial opening in the hub 9 of the rotor-crank, as shown in Fig. 6.

The peculiar form of the rotor 7 consists in its vertical reach 23, extending downward from its bearing, and in its bend 24 at the lower end of that reach and in its diagonal reach 25, extending outwardly and downwardly from that bend, and in its bend 26, extending away from the reach 25, and in its reach 27, extending upwardly from the bend 26, and in the bend 28, extending inwardly from the reach 27, and in the horizontal reach 29, extending inwardly from the bend 28 to the reach 23. The lower part of the reach 23, together with all parts of the other reaches and bends, constitutes a loop, which when rotated around the vertical location of the reach 23 through a deposit of flour and liquid in the pan will first mix that flour and liquid and then knead them into homogeneous dough in a prompt and effective manner. That loop incloses the area shown in Fig. 5 when it is viewed from above, and when it is viewed from the front it incloses the area shown in Fig. 4, and when it is viewed from the right-hand side it incloses the area shown in Fig. 3. The characteristics of the loop shown in the drawings include the fact that the reaches 25 and 29 extend away from the reach 23 about one hundred and ten degrees from each other and about thirty degrees and ninety degrees, respectively, from the reach 23 and with the point of junction of the reach 25 and the reach 23 a considerable distance below the point of junction of the reach 29 and the reach 23, and those characteristics also include the fact that the reach 27 is not in the same vertical plane nor in the same horizontal plane as the reach 29, but is in a vertical plane much rearward of the vertical plane of the reach 29, as shown in Figs. 2 and 5, and is in an inclined position much below the horizontal plane of the reach 29, as shown in Figs. 1 and 4, and those characteristics also include the fact that the reach 29, though it is higher than any other part of the loop, is lower than the plane of the edge 12 of the pan 1, and those characteristics also include the fact that the reach 27 extends between the bends 26 and 28 at an angle of about thirty-five degrees from the horizontal; but this angle will be less where the pan is less concave than that shown in the drawings. It is best to make the bend 28 have a shorter radius than the bend 26 and to make the reach 27 with a slight upward curve, as shown in Figs. 1 and 4, instead of being straight.

The rotor has a special mode of operation which results from its peculiar form. That special mode of operation is graphically illustrated in Figs. 4 and 5, where the courses taken by the dough relatively to the rotor are indicated by the arrows as fully as was found to be practicable by the draftsman, who made the drawings from a careful study of the relative movements of the rotor and the dough in an actual apparatus having such a rotor. Those movements cannot be accurately described in words; but they constitute a complex flowing of the dough through the loop and around the reach 23 in a direction opposite to that of the rotation of the rotor. This complex flowing of the dough results in kneading comparable in complication and thoroughness to hand kneading and materially different from whatever mixing and supposed kneading results from the rotation through a deposit of flour and water in a pan of a rod bent into the form of a sickle and rotated around a vertical shank corresponding with the handle of the sickle and is also materially different from whatever mixing and supposed kneading would result from the rotation through such a deposit of any looped-shaped stirrer which has no upper horizontal reach below the plane of the edge of the pan and has no lower inclined reach occupying a vertical plane rearward of that upper reach.

The horizontal reach 29 of the rotor 7 prevents the dough from climbing upward around the reach 23 above the plane of the edge of the pan during the rotation of the rotor. In performing that function the horizontal reach 29 also turns or rolls the upper portion of the dough down and under its lower portion.

I do not think it absolutely necessary for the reach 29 to be exactly horizontal and to extend quite to the reach 23, for I think it might slope upward, or even slightly downward, toward the reach 23 and might end a short distance before connecting therewith. So, also, I think the reaches 25, 27, and 29 might all have horizontal outward bends midway of their respective lengths, so as to give the loop a more circular appearance when seen from above than is shown in Fig. 5, and, indeed, those reaches might have inward horizontal bends midway of their lengths, so as to present a succession of compound curves when seen from above instead of two curves in the same direction, and the reaches and the bends might blend into each other so gradually that their exact junctions could not be marked with definite points or lines, and all of them might constitute a loop composed entirely of bends of varying degrees of curvature. For these reasons I do not limit my claims to the exact form of rotor shown in the drawings, and in using the word "loop" to designate that form I do not mean that the loop must be absolutely continuous and unbroken, but only that it shall be so nearly so as to work substantially the same as if it were so; but some of the characteristics of the rotor shown in the drawings are indispensable thereto, and I am quite willing to limit my claims in respect of those characteristics. These essential features of my rotor include the following: The upper reach 29 must be substantially horizontal, and it must be lower than the edge of the pan, though higher than any other part of the loop of the rotor. The reach 27 must be lower than the reach 29, as shown in Figs. 1 and 4, and it must also occupy a vertical plane rearward of the reach 29, as shown in Figs. 2 and 5, and the reach 25 must be still lower and more nearly horizontal than the reach 27, as shown in Fig. 3.

The general mode of operation of this apparatus is as follows: The upright standard 3 is fixed to the table by means of the set-screw 4. Thereupon the pan is placed on the table with a segment of its beaded edge 12 on the shelf 11 upon the upper end of the standard 3. The outer end of the radial bracket 5 is then placed in the position shown in Fig. 1 upon the upper end of the standard with its bifurcation astride the shank of the set-screw 6 and with its downward projections hooked over the upper end of the standard. The set-screw 6 is then screwed home, and thus causes the bracket to clamp a segment of the beaded edge of the pan between itself and the upper end of the standard, and thus to firmly hold the pan against the turning tendency which occurs in the use of the apparatus. Thereupon the two parts of the bracket 5, if not already united, are fastened together by means of the dowel 30 and the dowel-holder 31 and the dowel-latch 32. The rotor 7 and the rotor-crank 8 are also fixed to the bearing in the inner end of the bracket and are secured there by the rotor-latch 36 or the rotor-latch 16, as the case may be. Whatever liquid is used in making the dough is then poured into the pan, and the flour and the other ingredients of the dough are added thereto, and the cover is placed in the position shown in Fig. 1, as above described. Thereupon the crank is turned a few minutes, so as to rotate the rotor through the contents of the pan. That rotation first mixes the flour and liquid and other ingredients together and then thoroughly kneads those materials into homogeneous dough. The pan and its contents and cover are then left or set in a place of proper temperature, to remain there a few hours while the dough is rising. After that rising is finished the crank is again rotated a short time to reknead the dough as much as desired. Thereupon the cover is removed from the pan and the dowel-latch is turned far enough to release the inner part of the bracket 5 from the outer part thereof, and the inner part of the bracket and the rotor-crank are then used to lift the rotor and the dough out of the pan. Where the integral bracket of Figs. 6 and 7 is used and when the kneading is completed, the latch 16 is turned out of the groove 18 and the crank and the rotor are lifted far enough to allow the shank 14 of the rotor to be removed sidewise from the bifurcated bearing 15; but this operation takes longer than to disengage the two parts of the bracket of Figs. 1, 2, and 4, and the delay is apt to be long enough to cause the rotor to partly lose its hold upon the dough, and therefore to fail to lift the dough all out of the pan. It is for this reason that the bracket of Figs. 1, 2, and 4 is better than the bracket of Figs. 6 and 7.

I claim as my invention—

1. A dough mixer and kneader, consisting of the combination of a concave pan; a vertical standard; a radial bracket, removably clamped at its outer end to the top of that standard, with a segment of the edge of the pan rigidly held between them, and provided at its inner end with a bearing; and a rotor, consisting of a loop, having the vertical axial reach 23; and the upper horizontal reach 29, below the plane of the edge of the pan; and the inclined reach 27, lower than the reach 29, and rearward thereof; and the lower reach 25, lower than the reach 27, and more nearly horizontal than it; those reaches being connected by the bends 24, 26, and 28; and that rotor having a vertical shank turning in the bearing at the inner end of the radial bracket, and being turned by a crank fixed to that shank; all substantially as described.

2. A dough mixer and kneader, consisting of the combination of a concave pan; a vertical standard; a radial bracket, removably clamped at its outer end to the top of that standard, with a segment of the edge of the pan rigidly held between them, and provided at its inner end with a bearing, and having its inner part detachably connected with its outer part; and a rotor, consisting of a loop, having the vertical axial reach 23; and the upper horizontal reach 29, below the plane of the edge of the pan; and the inclined reach 27, lower than the reach 29, and rearward thereof; and the lower reach 25, lower than the reach 27, and more nearly horizontal than it; those reaches being connected by the bends 24, 26, and 28; and that rotor having a vertical shank turning in the bearing at the inner end of the radial bracket, and being turned by a crank fixed to that shank; all substantially as described.

3. In a dough mixer and kneader; a rotor consisting of a loop, having the vertical axial reach 23; and the upper horizontal reach 29, below the plane of the edge of the pan; and the inclined reach 27, lower than the reach 29, and rearward thereof; and the lower reach 25, lower than the reach 27, and more nearly horizontal than it; those reaches being connected with the bends 24, 26, and 28; and that rotor having a vertical shank, adapted to turn in an axial bearing above the loop; all substantially as described.

OLIVER D. WOODRUFF.

Witnesses:
ALBERT H. WALKER,
FREDERICK C. HUNTER.